Aug. 5, 1958     D. L. MATHESON     2,846,219
MOTION PICTURE FILM REELS
Filed July 19, 1956     2 Sheets-Sheet 1

Duayne L. Matheson INVENTOR.

BY Clarence A. O'Brien
and Harvey B. Jacobson

Aug. 5, 1958  D. L. MATHESON  2,846,219
MOTION PICTURE FILM REELS
Filed July 19, 1956  2 Sheets-Sheet 2

Duayne L. Matheson INVENTOR.

BY *Clarence A. O'Brien*
*and Harvey B. Jacobson*
Attorneys

United States Patent Office 2,846,219
Patented Aug. 5, 1958

2,846,219

MOTION PICTURE FILM REELS

Duayne L. Matheson, Cedar City, Utah, assignor of one-third to Ianthus Wright, Cedar City, Utah Application July 19, 1956, Serial No. 598,869

4 Claims. (Cl. 271—2.17)

This invention relates to motion picture projectors and particularly to a film handling system to eliminate the rewinding of the motion picture film.

An object of the invention is to provide an assembly for any type of motion picture projector, which eliminates the necessity for rewinding film after it is used. Present practice requires that film be rewound after it is used. This is to orient the film properly on the reel whereby it may be again used in the projector. The present invention has for one of its prime objects the elimination of the necessity for this rewinding.

The above object is achieved by having a pair of specially constructed reels that are adapted to be mounted on the conventional spindles of any manufacturer's make projector. The first reel, usually the upper reel on the projector, from which film is payed out is arranged so that a plurality of strips are adapted to contact the periphery of a roll of film and hold the film supported in such a way so that it is withdrawn from the reel at the inside rather than outside thereof. The reel is guided for this purpose, preventing tangling and other difficulties that may be encountered. One of the features of the invention is the manner in which the two walls of this reel are adjusted and held in selected, adjusted position in order to accommodate various sizes of film rolls. For example, the film roll may be made of 50 feet of film or 300 feet of film and accommodated with equal facility by an extremely simple adjustment.

A further object of the invention is to provide a non-rewind system for motion picture projectors where the film after being passed through the projector is accepted by a second reel having inner and outer walls detachably connected together and one of these walls supporting a collapsible hub that stays extended or erect while the inner and outer walls are joined, but automatically collapses for the easy removal of the film, immediately upon separation of the inner and outer walls of this second reel.

A further object of the present invention is to provide a practical system that may be used in connection with all projectors of which I am aware and including projectors of various film diameters, usually ranging from 8 millimeters up, the system making it unnecessary to rewind the film after it is used. In addition, it is a practice for amateurs and professionals to store film on reels, necessitating a separate reel for each strip of film so that the film may be applied to the projector with reasonable dispatch. Practice of the invention described herein dispenses with the necessity of having a single reel for each strip of film. The film may be stored in cans or other containers and in roll form without being applied to an individual reel. Not only is an economy involved but also the hobbyist finds it necessary to purchase inexpensive reels on which to store various films and these reels become easily bent and misaligned. This makes for noisy projector operation due to the edges of the film scraping on the reels. Inasmuch as only two reels are necessary for the hobbyist in order to show with great dispatch any of his film, a high quality pair may be obtained.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 7:
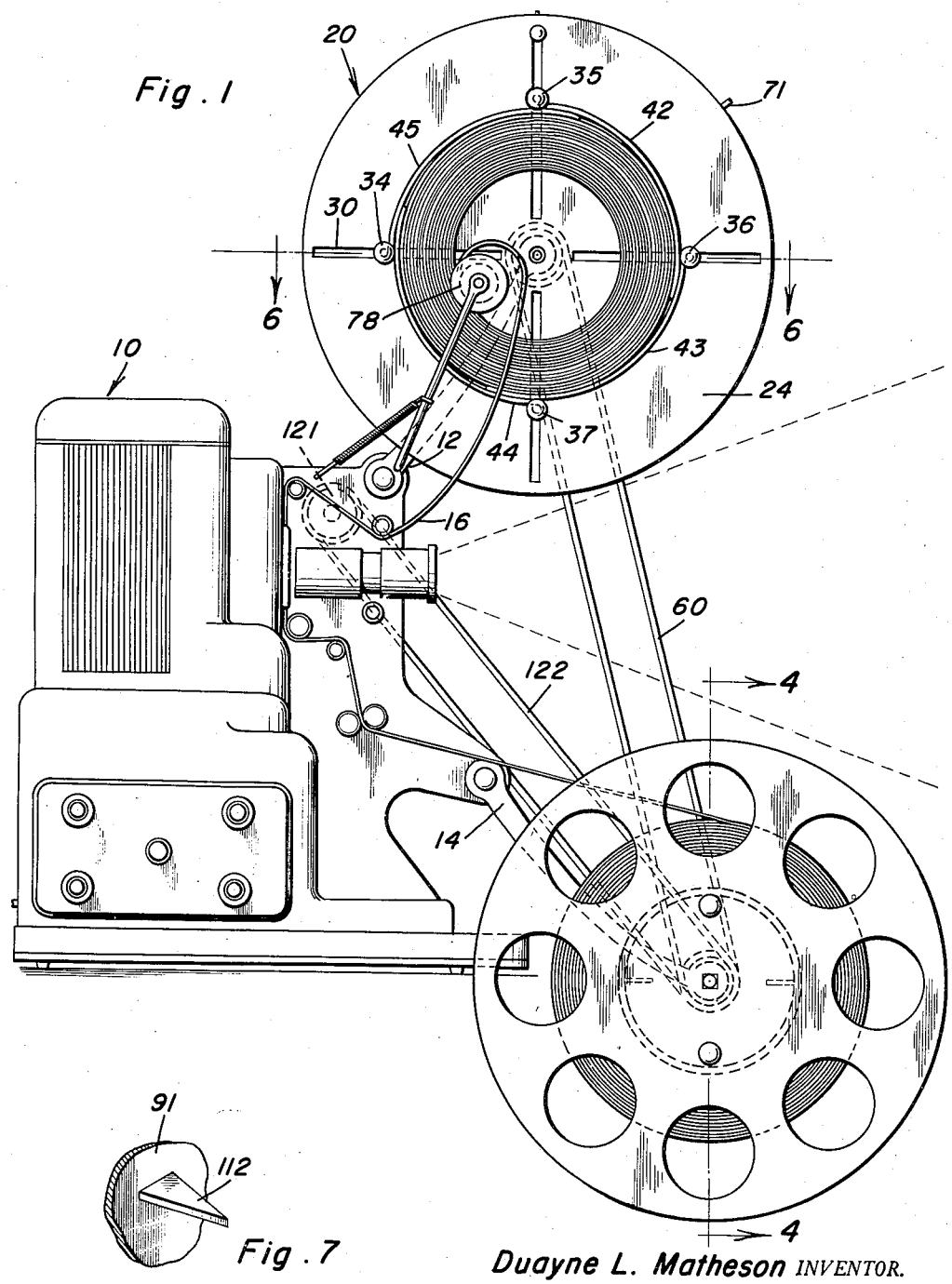
Figure 1 is an elevational view of one type of commercially available projector having the principles of the invention applied to it.
Figure 7 is a fragmentary perspective view showing one of the spreaders that holds the hub of the lowermost reel in the extended position.
Figure 2:
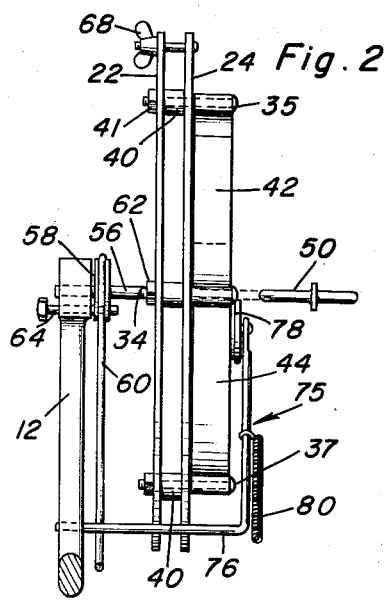
Figure 2 is a sectional view showing the first reel in elevation.
Figure 3:
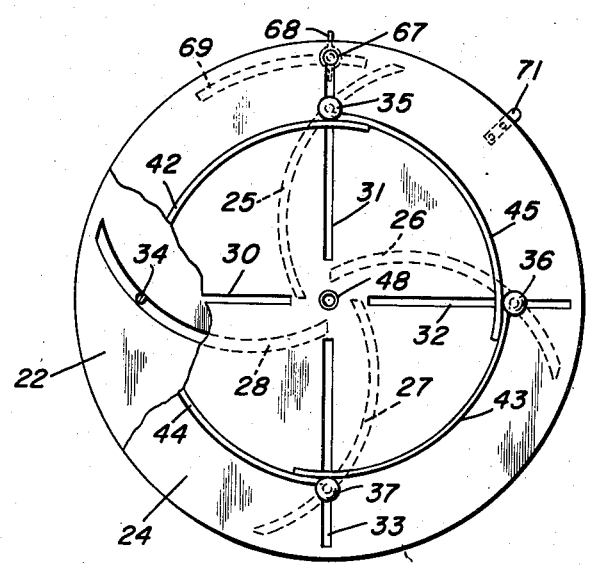
Figure 3 is a side view of the reel in Figure 2, parts being broken away to illustrate otherwise hidden detail of construction.
Figure 4:
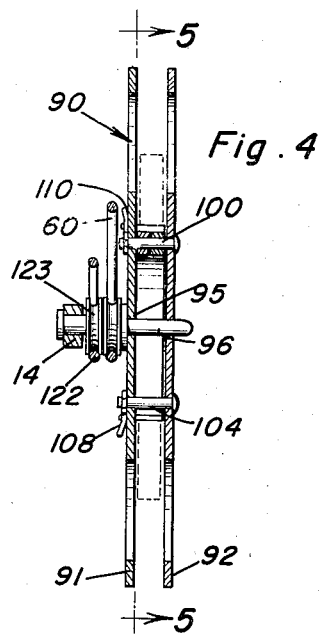
Figure 4 is a sectional view taken on the line 4—4 of Figure 1.
Figure 5:
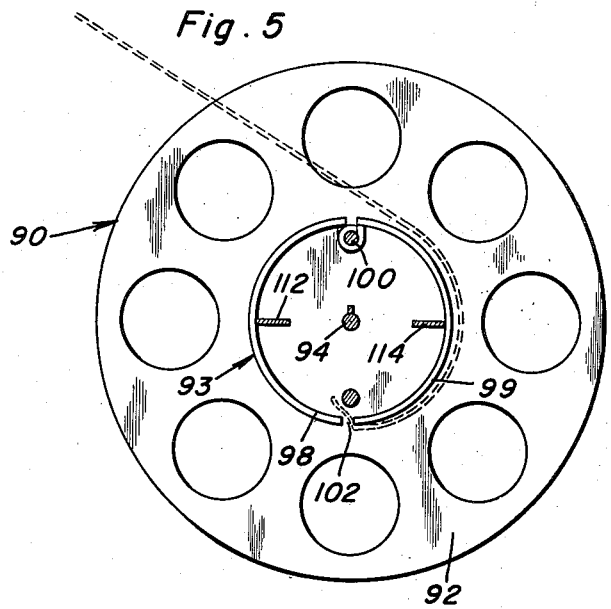
Figure 5 is a sectional view taken on the line 5—5 of Figure 4.
Figure 6:
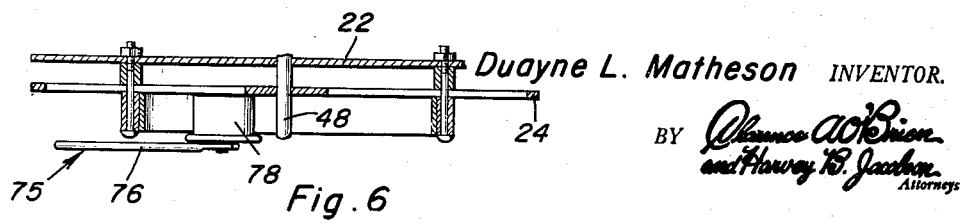
Figure 6 is a sectional view taken on the line 6—6 of Figure 1.

Projector 10 is of a standard manufacturer's make and includes among other necessary structures an upper arm 12 together with a lower arm 14 designed to accommodate reels for film 16 that passes through the projector when using the projector. The first reel 20 made in accordance with the invention consists of two circular walls 22 and 24. The first, inner wall 22 has four arcuate slots 25, 26, 27 and 28 which extend from the center part of the wall toward the periphery thereof. The second, outer wall 24 has four radial slots 30, 31, 32 and 33. Four pins 34, 35, 36 and 37 are passed through pairs of these slots, each pair consisting of one radial slot and one arcuate slot. Spacers 40 are applied onto the pins so as to hold the walls spaced from each other. These pins may be in the form of bolts having nuts 41 at one end and heads at the other end. Each pin accommodates an arcuate strip, there being four strips 42, 43, 44 and 45 in all. The strips have sleeves formed at their ends that are fitted tightly on the shanks of the pins, and the strips are of considerable length so that for most film roll diameters the confronting ends of the strips will overlap (Fig. 1).

Hollow shaft 48 is at the center of the walls 22 and 24, being rotatively connected with each, and it protrudes beyond the front face of wall 24 in order to accommodate the spindle 50 to be described subsequently.

Arm 12 of the projector has a spindle 56 on which drive pulley 58 is secured. A belt 60 of any standard description, is engaged with pulley 58 in order to drive the pulley. There are a number of ways in which the ordinary reel is drivingly connected to the upper spindle or shaft 56 of the projector, only one being illustrated but being schematically representative of all other standard devices. The illustrated means are simply a key 62 and slot in wall 22 with which the key is engageable. Pin 64 is applied in an opening in arm 12 and so disposed in relation to the pulley that upon pushing the pin 64 in one direction it passes through one of the openings in the pulley preventing it from rotating. This is done when adjusting the reel 20 or when loading it.

One of the slots, for example, slot 31 in wall 24 has a bolt 67 on which wing nut 68 is mounted. The bolt passes through a curved slot 69 in wall 22 in order to constrain the motion of the two walls 22 and 24 with respect to each other. One wall has a handle 71 secured to it to facilitate the manual adjustment of the walls with respect to each other. In order to adjust the positions of strips 42, 43, 44 and 45 with respect to each other, wing nut 68 is loosened and the walls rotated with respect to each other. This causes pins 34, 35, 36 and 37 to slide in their pairs of slots and adjust the relative disposition of the strips. When the proper strip location is obtained, the nut 68 is tightened.

As previously indicated, the film is adapted to be payed out from the center thereof (Fig. 1) rather than conventionally from the outer periphery thereof. Accordingly, a guide 75 is operatively connected with the reel 20. It is preferred that the guide consist of an L-shaped arm 76 having one end mounted pivotally in arm 12 and the other end supporting a flanged roller 78 over which the film is adapted to pass. This roller is biased against the inside of the roll of film by a spring 80 that has one end attached to arm 76 and the other end attached to a part of the projector adjacent to arm 12.

As the film 16 proceeds from reel 20 and passes through the projector, it enters the second reel 90 which is also of special construction. This reel is made of inner and outer walls 91 and 92 that are circular in planform. The outer wall 92 has a collapsible hub 93 in the center thereof and a keyhole bearing 94 to engage with the key 95 on shaft 96, the latter being mounted for rotation in arm 14. Collapsible hub 93 is made of two arcuate sections 98 and 99. Sections 98 and 99 have confronting ends that are hingedly connected on hinge pin 100 and opposite confronting ends that are held normally spaced from each other to provide a film receiving slot 102. The outer surface of sections 98 and 99 constitute the film supporting surface of the lower reel 90. In addition to pin 100 there is at least one other pin 104 that is also carried by the outer wall 92, both of these pins being passed through apertures in the inner wall 91 and held releasably latched in place by means of pivoted latches 108 and 110 which are held in place by other quickly and easily detached means. Accordingly, the two walls are separably connected with each other. When the walls are assembled, two spreaders, as cams 112 and 114 carried by inner wall 91 hold the sections 98 and 99 extended to the operative, film supporting position. But when the inner and outer walls are detached from each other, the hub 93 automatically collapses inasmuch as the spreaders 112 and 114 are spaced from the hub.

In use, reels 20 and 90 are applied to the projector 10. These reels are powered in the customary way, for example, from a drive pulley or sprocket 121 on the projector 10 around which belt or chain 122 is entrained. This drive member 122 is entrained over a double pulley 123 fixed on shaft or spindle 96. The previously mentioned drive element 69 is also entrained over the double pulley 123 and around pulley 58 for the purpose of powering the reel 20.

It is assumed that the reels are applied to the projector in the unloaded condition. In order to load the reel 20 after it has been adjusted as described previously, the spindle 50 is inserted in the hollow shaft 48 in order to transfer the film from the conventional reel, as purchased, to the split reel 90. The regular reel on which the purchased film is stored is placed on the outer extremity of the short detachable spindle 50 and the end is wound around the reel 90 and placed in slot 102. After applying it to the split reel 90 in this way, the two parts of the reel are separated from each other in order to permit the hub 93 to collapse. In the collapsed condition the film is lifted from the collapsed hub in a roll and placed in the reel 20. The end is pulled over the roller 78 and threaded through the projector. It is again inserted in slot 102 of reel 90 and the projector set into operation. After the film is screened it is again ready to be placed on reel 20 for further screening or to be stored.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A film handling assembly for a projector wherein the necessity for rewinding is obviated, said assembly comprising a first reel that has a first and a second wall, radial slots in one wall and curved slots in the other wall, pins extending across said walls and mounted in pairs of said slots, a curved strip secured to each pin, said strips cooperating with each other to form a substantially closed circular support for the periphery of the film, said walls being rotatively adjustable with respect to each other in order to alter the relative positions of said strips, and means to lock said walls in a selected position, a guide for the film as it is withdrawn from said first reel, said guide comprising a rotatable flanged roller and means resiliently urging said roller into contact with said film on the inner periphery thereof, a second reel on which the film from the first reel is adapted to be wound, said second reel comprising inner and outer walls, a collapsible hub between said inner and outer walls, means detachably connecting said inner and outer walls, and means holding said hub in the expanded position while said walls are connected and means for automatically releasing said hub to collapse in response to a separation of said inner and outer walls.

2. In a film handling assembly for a projector, the combination of a first and a second reel operatively carried by said projector and between which film is adapted to be passed, said first reel being adapted to support a roll of film, said second reel having a pair of walls, a collapsible hub carried by said walls and including a pair of hub sections, means pivotally connecting said sections together, said sections having a pair of confronting ends that are spaced from each other to provide a film entrance slot, means on one of said walls holding said sections spread to an operative position while said walls are assembled with each other and permitting said sections to collapse by pivoting toward each other in response to separation of said walls, the last mentioned means comprising a pair of cams carried by one of said reel walls, and said hub sections being pivotally carried by the opposite reel wall.

3. In an assembly for handling film in a projector so that rewinding of the film is unnecessary, a first reel having a first and a second wall, said walls being rotatively adjustable with respect to each other, means for locking said walls in selected, adjusted positions, means responsive to the relative adjustment of said walls for providing a roll film accommodating pocket with the end of the film adapted to be drawn from the inner part of the pocket, a guide for the film as it is withdrawn from said pocket comprising a rotatable flanged roller, means resiliently urging said roller into contact with the film on the inner periphery thereof, and a take-up reel to which the film is adapted to be connected, said take-up reel including inner and outer walls with means detachably connecting said walls together, and an automatically collapsible hub on which the film is adapted to be wound located between said inner and outer walls and means for collapsing said hub in response to separation of said walls.

4. A film reel construction comprising a pair of walls, a collapsible hub carried by said walls and including a pair of hub sections, means pivotally connecting said sections together, said sections having a pair of confronting ends that are spaced from each other to provide a film entrance slot, means on one of said walls holding said sections spread to an operative position while said walls are assembled with each other and permitting said sections to collapse by pivoting toward each other in response to separation of said walls, the last mentioned means comprising a pair of cams carried by one of said reel walls and said hub sections being pivotally carried by the opposite reel wall.

References Cited in the file of this patent

UNITED STATES PATENTS

| | | |
|---|---|---|
| 1,116,580 | Feaster | Nov. 10, 1914 |
| 1,186,924 | McNeel | June 13, 1916 |
| 1,266,254 | Hansen | May 14, 1918 |
| 1,731,490 | Gottschau | Oct. 15, 1929 |
| 2,661,210 | Yeats | Dec. 1, 1953 |